(12) United States Patent
Denk et al.

(10) Patent No.: US 10,583,377 B2
(45) Date of Patent: Mar. 10, 2020

(54) RAIN WATER FILTER

(71) Applicant: WISY AG Haustechniksysteme, Filtertechnik, Kefenrod (DE)

(72) Inventors: Arnold Denk, Gedern (DE); Jan Maurer, Witzenhausen (DE); Alfred Jost, Kefenrod-Burgbracht (DE); Alexander Schweizer, Birstein (DE); Friedrich W. Poerschke, Bottrop (DE)

(73) Assignee: WISY AG Haustechniksysteme, Filtertechnik, Kefenrod (DE)

( * ) Notice: Subject to any disclaimer, the term of this patent is extended or adjusted under 35 U.S.C. 154(b) by 442 days.

(21) Appl. No.: 15/505,531

(22) PCT Filed: Aug. 19, 2015

(86) PCT No.: PCT/DE2015/000413
§ 371 (c)(1),
(2) Date: Feb. 21, 2017

(87) PCT Pub. No.: WO2016/026479
PCT Pub. Date: Feb. 25, 2016

(65) Prior Publication Data
US 2017/0274302 A1    Sep. 28, 2017

(30) Foreign Application Priority Data
Aug. 22, 2014 (DE) .................. 10 2014 012 288

(51) Int. Cl.
*B01D 29/33* (2006.01)
*B01D 35/02* (2006.01)
(Continued)

(52) U.S. Cl.
CPC .......... *B01D 29/336* (2013.01); *B01D 29/33* (2013.01); *B01D 35/02* (2013.01); *C02F 1/001* (2013.01);
(Continued)

(58) Field of Classification Search
CPC ........ E04D 13/076; E04F 13/04; E04F 19/00; E03F 1/00; E03B 1/7053; E03B 3/02; B01D 35/02
See application file for complete search history.

(56) References Cited

U.S. PATENT DOCUMENTS

| | | | | |
|---|---|---|---|---|
| 5,234,589 A | * | 8/1993 | Sussich .................. | B01D 35/02 210/297 |
| 2002/0153334 A1 | * | 10/2002 | Sharkey ................. | B01D 29/01 210/791 |
| 2018/0361276 A1 | * | 12/2018 | See ......................... | C02F 1/001 |

FOREIGN PATENT DOCUMENTS

| | | |
|---|---|---|
| AU | 2009100093 B4 | 3/2009 |
| DE | 38 12 136 A1 | 2/1989 |
| (Continued) | | |

OTHER PUBLICATIONS

PCT/DE2015/000413, International Search Report dated Jan. 22, 2016 (Two (2) pages).
(Continued)

*Primary Examiner* — Ana M Fortuna
(74) *Attorney, Agent, or Firm* — Crowell & Moring LLP

(57) ABSTRACT

A rain water filter is disclosed. The rain water filter includes a horizontal inlet and a horizontally arranged residual water outlet which are slightly offset in relation to each other. A pipe with a longitudinal slot connects to the inlet and the pipe leads into the residual water outlet. An adhesive filter which is in the form of a tunnel-shaped half-shell is arranged below the longitudinal slot, where the lateral walls are the filter surfaces of the filter. Due to the adhesion effect, the water which flows past is suctioned inwards where it passes through the longitudinal opening into a tank and from there, for example, into a cistern via a filter water outlet. The water running off from the side walls is collected on the base of the hollow cylinder and from there is guided to the residual water outlet.

9 Claims, 4 Drawing Sheets

(51) Int. Cl.
*C02F 1/00* (2006.01)
*C02F 103/00* (2006.01)
*E03B 3/02* (2006.01)

(52) U.S. Cl.
CPC .......... *E03B 3/02* (2013.01); *C02F 2103/001* (2013.01); *Y02A 20/108* (2018.01)

(56) References Cited

FOREIGN PATENT DOCUMENTS

| | | |
|---|---|---|
| DE | 93 16 672 U1 | 3/1994 |
| DE | 197 25 997 A1 | 2/1998 |
| DE | 196 50 023 A1 | 6/1998 |
| DE | 200 15 675 U1 | 2/2001 |
| DE | 199 42 240 A1 | 4/2001 |
| DE | 201 07 164 U1 | 10/2001 |
| DE | 100 48 740 A1 | 4/2002 |
| EP | 2 365 140 A2 | 9/2011 |
| JP | 2009-102867 A | 5/2009 |

OTHER PUBLICATIONS

German Search Report issued in German counterpart application No. 10 2014 012 288.3 dated Aug. 3, 2015, with English translation (Fifteen (15) pages).

\* cited by examiner

RAIN WATER FILTER

This application claims the priority of International Application No. PCT/DE20151000413, filed Aug. 19, 2015, and German Patent Document No. 10 2014 012 288.3, filed Aug. 22, 2014, the disclosures of which are expressly incorporated by reference herein.

BACKGROUND AND SUMMARY OF THE INVENTION

The invention relates to a rain water filter having a housing, which is provided with a horizontally running lateral inlet, a horizontally running lateral residual water outlet for unfiltered water and a filter water outlet for filtered water, wherein a horizontally running upper water course connects to the inlet in the housing, which leads to the residual water outlet, and having a filter for filtering the inflowing water, the filter surface of which follows the upper water course in the horizontal direction.

This type of rain water filter is described in DE 199 42 240 C2. The inlet and the residual water outlet lie at the same height in relation to the installation position of the rain water filter. They are connected to each other via a horizontally running filter pipe, which forms the upper water course. It extends over the filter water outlet. The water flows via the inlet into the one end of the filter pipe, wherein a portion of the water penetrates through the meshes of the filter pipe through the force of gravity and flows to the filter water outlet, while the other portion passes through the filter pipe and reaches the residual water outlet.

Because the inlet and the residual water outlet are at the same height, the height of the housing is relatively small. As a result, it can also be installed readily in an entrance hole of a cistern.

However, the disadvantage of this arrangement is that, particularly when the water flow is low, residues that are filtered out are left behind in the filter pipe, which clogs the filter pipe little by little so that it must be cleaned regularly.

Therefore, the invention is based on the objective of creating a rain water filter, which has a low installation height and is self-cleaning despite a low offset between the inlet and the residual water outlet.

To attain this objective, the invention provides that the residual water outlet is downwardly offset in relation to the inlet, that a horizontally running lower water course is located below the upper water course, which merges into the residual water outlet and that the filter is arranged such that the unfiltered water running off from the inlet side of the filter reaches the lower water outlet and from there the residual water outlet.

With this type of filter, a vertical flow occurs along the substantially vertically aligned filter surface, which prevents filter residues from depositing there. Instead the filter residues are always flushed from the inlet side of filter through the support of gravity.

The filter is preferably an adhesive filter. The type of rain water filter, in which the water runs off on a substantially vertically aligned filter surface and is pulled through the filter in the process through the forces of adhesion, is known, for example, from DE 38 12136 A1. The filter is a so-called adhesive filter, which is designed as a pipe and is arranged vertically in the housing of the rain water filter. The inflowing water runs vertically into the pipe and through the pipe into a residual water outlet located below the pipe, which is arranged on the base of the rain water filter housing. The water suctioned through the adhesive filter reaches a collection chamber on the lower end of an annular space between the pipe and the housing and is routed from there into a cistern via a lateral filter water outlet.

In order to obtain an adequate yield, the filter pipe requires a certain height so that the distance between the inlet on the upper end of the pipe and the filter water outlet on the lower end of the pipe is relatively large, which makes this type of rain water filter unsuitable to be accommodated in the entrance hole of a cistern.

Because, according to the invention, the vertical height of the filter cannot be very large (the offset between the inlet and the residual water outlet is supposed to remain low), a certain length of the filter is required. This is achieved in that the upper water course is formed by a channel, which has a longitudinal slot on its base, wherein the filter is located below the longitudinal slot.

The water consequently flows from the inlet via the upper water course in the direction of the filter water outlet, wherein, on its path along the upper water course, the water runs downwardly through the longitudinal slot and encounters the filter there. There it runs vertically along the filter surface and is suctioned in part through the filter, while the non-suctioned portion reaches the other water outlet and from there also the residual water outlet.

So that the water flows into the longitudinal slot in a manner that is distributed as equally as possible over the length of the longitudinal slot, it is provided that the size of the local curvature of the base of the channel in the region of the longitudinal slot gets smaller from the inlet end towards the residual water outlet end.

The channel is thus flatter on the inlet end than on the residual water outlet end. Because the water quantity on the inlet end is still large and the water level therefore has a certain height above the channel base, the water is already pushed by its pressure in the direction of the longitudinal slot so that the base regions on both sides of the longitudinal slot do not require a large transverse gradient (inclination in the direction of the longitudinal slot). The water quantity has already gotten smaller on the residual water outlet end, which, however, is compensated for by an enlarged transverse slope.

The shape of the channel base can be an ellipse, a cycloid or preferably a clothoid, wherein the parameters thereof change towards the residual water outlet end such that a circle is present there.

Two filter surfaces are provided to increase the yield. To this end, the filter consists of a half shell with a U-shaped cross-section, wherein the half shell sits with its open side downward on the lower water course and the crown of the half shell runs below the longitudinal slot. The filter surfaces are located in both walls of the half shell.

The water flowing through the longitudinal slot therefore encounters the crown of the half shell and flows further downward on both sides of the half shell, along the filter surfaces. In the process, the largest portion of the water reaches the interior of the half shell through the filter based on an adhesion effect, wherein a filtering takes places.

So that the filtered water can reach a filter water outlet, there is a longitudinal opening in the lower water course between the lateral walls of the half shell; in addition, a tank is located below the lower water course, which tank is connected to the filter water outlet.

Thus, the filtered water flows through the longitudinal opening into the tank and from there further into the filter water outlet. In the process, the tank acts as buffer for cases when more filtered water accrues than is able to flow off directly into the filter water outlet.

To prevent unfiltered water from getting under the half shell, the half shell is closed on the ends thereof.

In one concrete embodiment, the housing of the rain water filter has two opposing end walls, wherein the inlet is located in the one end wall and the residual water outlet is located in the other end wall. A hollow cylinder that is open on both sides and merges with a uniform cross-section into the residual water outlet runs between the end walls. Located in the upper portion of the hollow cylinder is a pipe, which connects with a uniform cross-section to the inlet. Because the pipe has a smaller cross-section than the hollow cylinder, a crescent space forms between the outer wall of the pipe and the inner wall of the hollow cylinder. It serves to accommodate the filter. The pipe therefore forms an upper water course, while the hollow cylinder forms the lower water outlet.

The end walls are preferably connected to each other via a half-shell-shaped base, which forms the tank to receive the filtered water, wherein the longitudinal edges of the base lie against the outer sides of the hollow cylinder in order to form a closed receiving space.

Even though this type of filter does not tend to get clogged up, a cleaning is in fact required from time to time. Therefore, the invention provides for the hollow cylinder to be held detachably on the end walls. As a result, the hollow cylinder can be removed from the housing for cleaning.

For this purpose, it is provided that a half-arc runs on the inner side of the one end wall, into which the one end of the hollow cylinder can be inserted from above and a collar or an offset for the uniform cross-sectional accommodation of the pipe is formed on the inner side of the other end wall.

The invention will be explained in greater detail in the following on the basis of one exemplary embodiment.

DETAILED DESCRIPTION OF THE DRAWINGS

Figure 1:
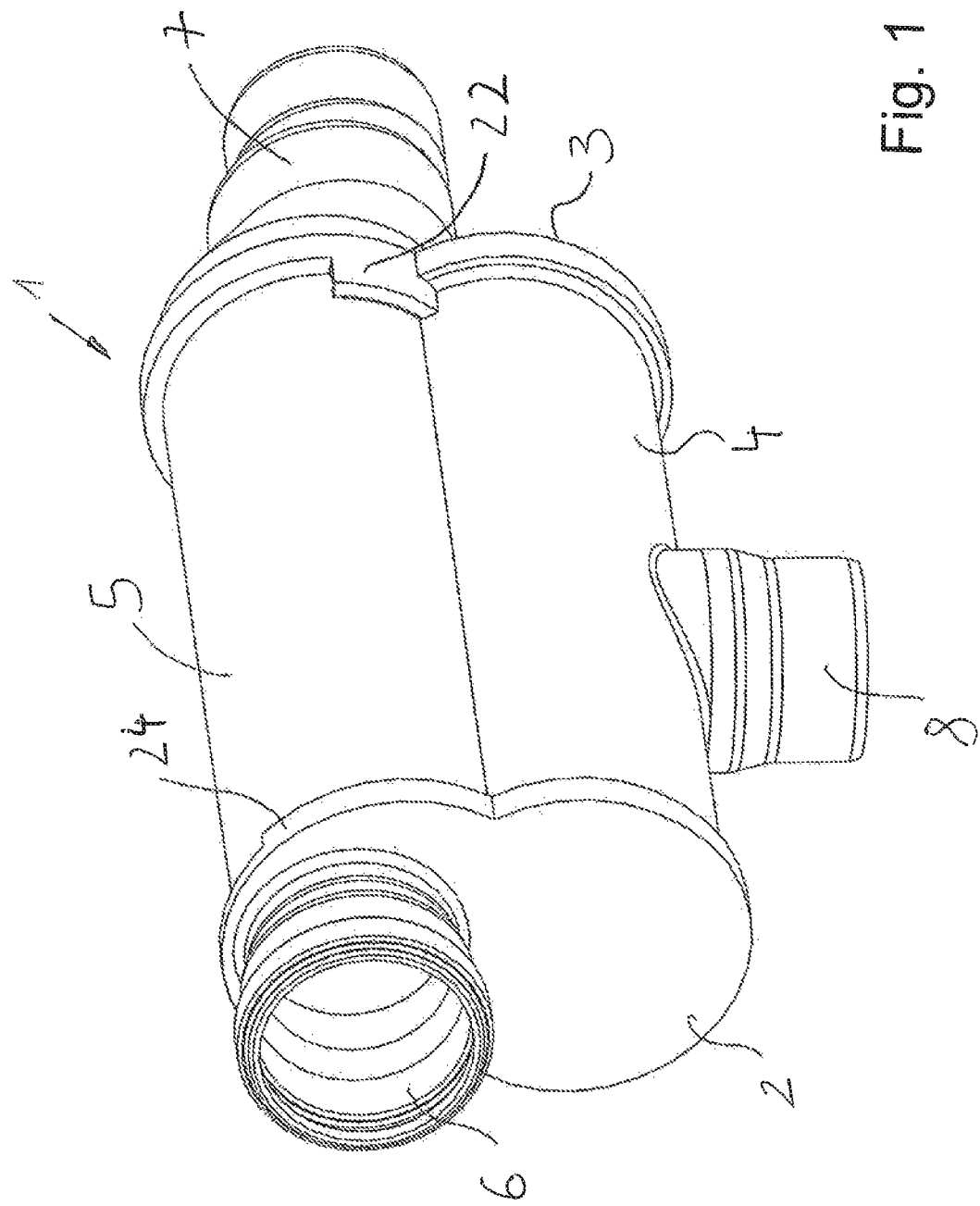
FIG. 1 shows an exterior view of a rain water filter according to the invention.

Reference is made first to FIG. 1. The rain water filter consists of a housing 1, which is made of two end walls 2, 3 and a half-shell-shaped base 4 that connects the end walls, Located above the base 4 is a hollow cylinder 5, which extends from the one end face 2 to the other end face and adjoins the longitudinal edges of the base 4.

Located on the one end wall 2 is an inlet 6 in the form of a connecting piece and a residual water outlet 7 on the other wall 3, likewise in the form of a connecting piece, wherein the cross-section of the residual water outlet in the region of the end wall 3 is greater than the diameter of the inlet 6.

The axes of the inlet 6 and of the residual water outlet 7 are offset relative to each other. The residual water outlet 7 is located somewhat deeper than that of the inlet 6.

A filter water outlet 8 is located on the underside of the base.

The selected designations of "upper" and "lower" relate to the installation position depicted in FIG. 1. This is characterized in that the inlet 6 and the residual water outlet 7 run substantially horizontally, while the filter water outlet 8 points vertically downward.

The connecting piece of the residual water outlet 7 obtains a gradual cross-sectional narrowing, wherein the base line remains at the same height. This makes it possible to connect further pipes having different cross-sections.

Figure 2:
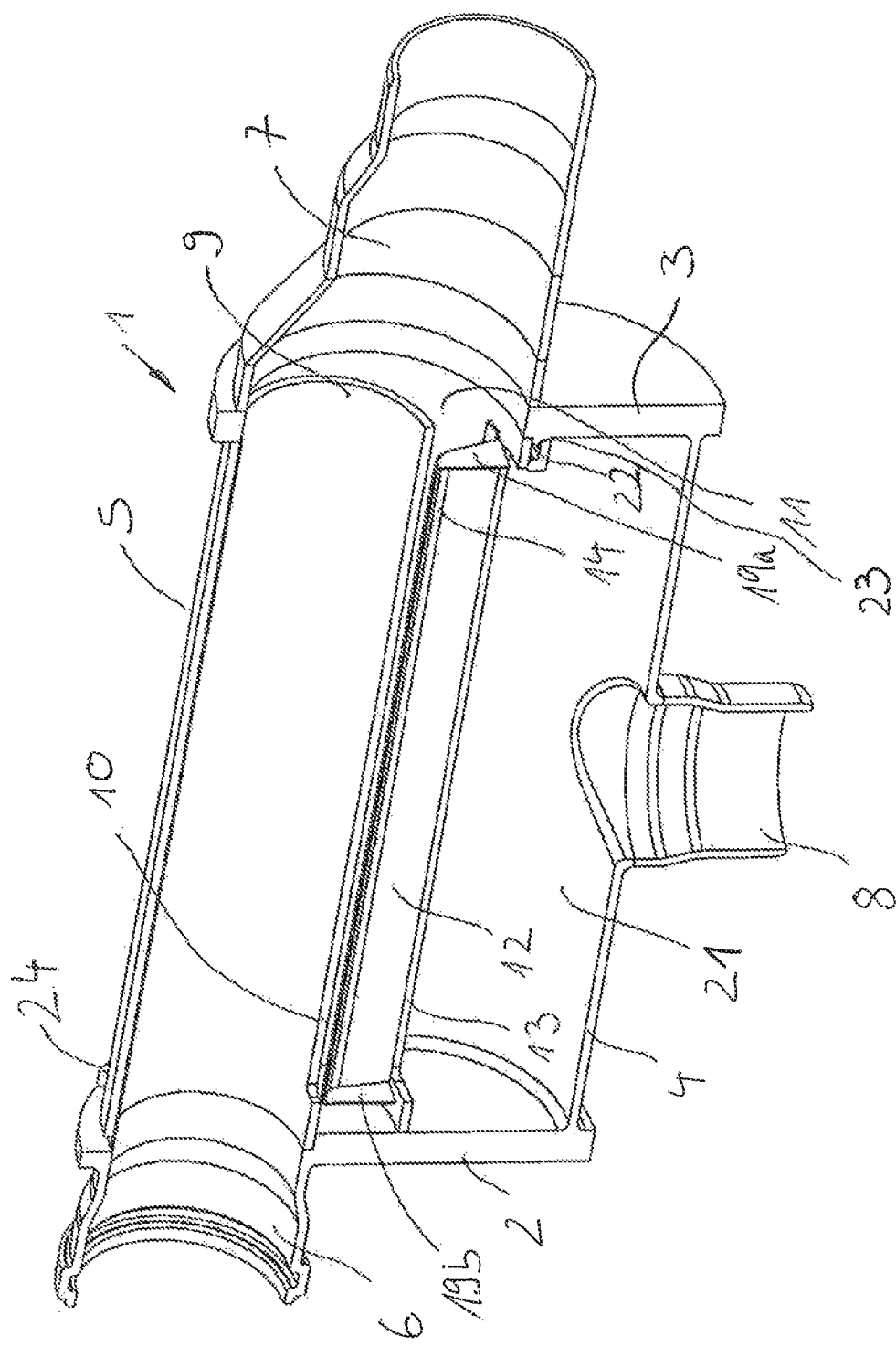
FIG. 2 is a longitudinal section through the rain water filter according to FIG. 1, which illustrates the arrangement of a filter of the rain water filter.

The longitudinal section in FIG. 2 shows the inner structure of the rain water filter.

Located inside the hollow cylinder 5 is a pipe 9 with a smaller cross-section, which is fastened with a generating line on the upper generating line of the hollow cylinder 5. Located in the opposing lower generating line of the pipe 9 is a longitudinal slot 10, which is open at the edge at the end of the pipe 9 pointing towards the residual water outlet 7.

At the end of the inlet 6, the pipe 9 projects over the hollow cylinder 5 and is inserted there with a uniform cross-section into the inlet 6 so that all water that flows through the inlet 6 to the rain water filter reaches the pipe 9.

Because the pipe 9 is smaller than the hollow cylinder 5 and is fastened thereto at a generating line, a crescent space 11 forms in the lower region of the hollow cylinder 5. A filter 12 is located here above a longitudinal opening 13 in a lower generating line of the hollow cylinder 5.

Figure 3:
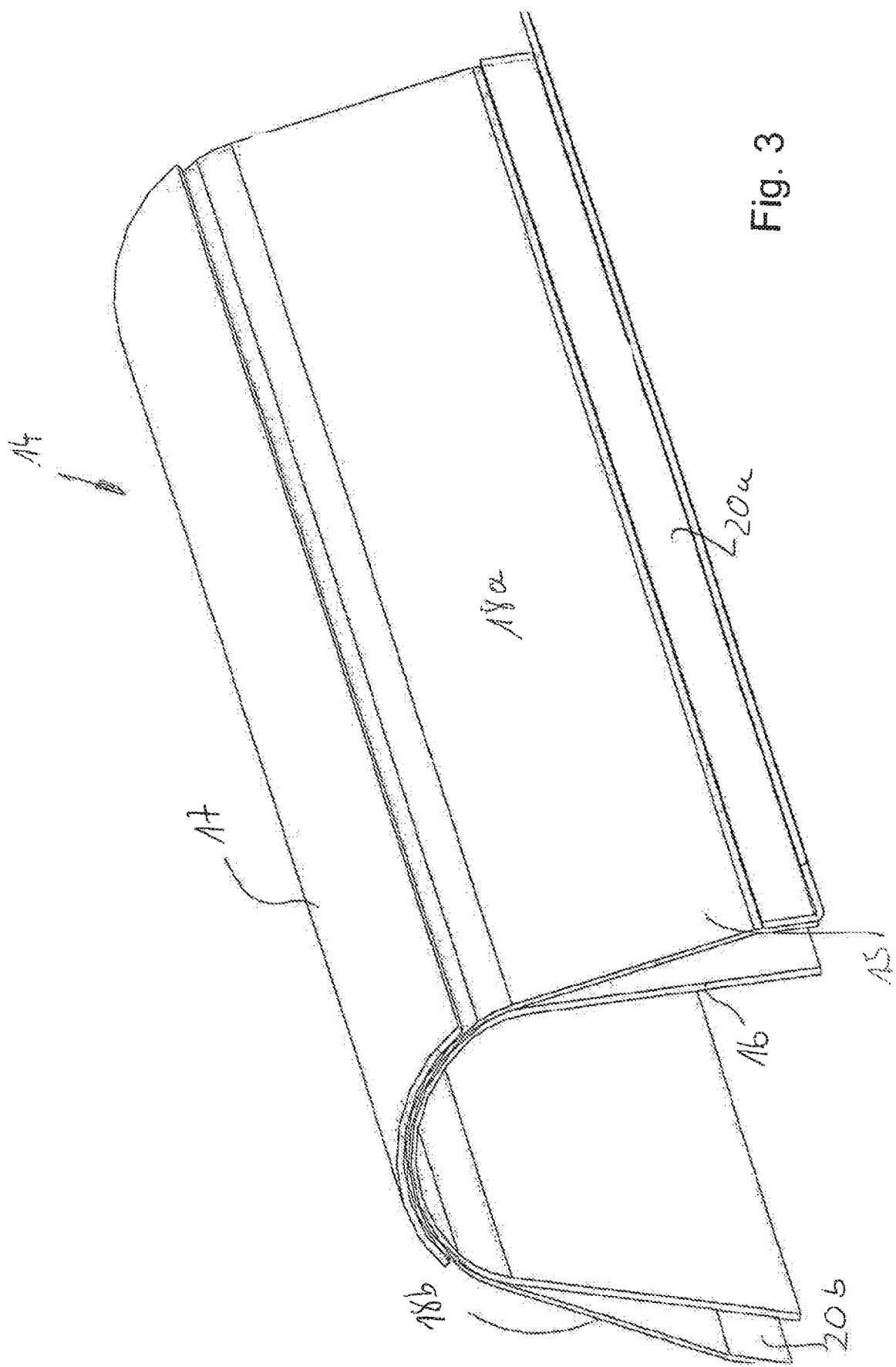
FIG. 3 shows a perspective representation of the filter.

As FIG. 3 shows, the filter 12 consists of a tunnel-shaped half shell 14, which is composed of two layers 15, 16. The layers rest against one another on the crown region of half shell and have an ever greater distance from each other towards the longitudinal edges of the half shell 14.

In addition, a water permeable cover 17 is located on the crown of the half shell 14. The lateral walls 18$a$, 18$b$ of the outer layer 15 are configured as filter surfaces. Located on the lower edges of each filter surface is a deflector plate 20$a$, 20$b$ in the form of an elongated strip, which connects with its lower longitudinal edge to the base of the hollow cylinder. The deflector plates 20$a$, 20$b$ have a closed smooth surface. This type of surface does not create a barrier for the water flowing off the base of the hollow cylinder 5 in the direction of the residual water outlet, like a porous filter surface would.

As already explained, the water runs through the longitudinal slot 10 of the pipe 9 on the crown of the half shell 14, and runs there to both sides of the cover 17 on the respective lateral surfaces 18$a$, 18$b$. Because the filter surfaces are substantially aligned vertically, the majority of the water would normally flow off on them without reaching inwardly into the half shell 14.

The inner layer 16 is provided for this purpose, which acts as an adhesion element and draws the water flowing on the outer layer 15 through the filter surfaces into the lateral walls 18$a$, 18$b$. The underlying adhesion principle is described in more detail in DE 199 42 240 C2.

The largest portion of the water therefore reaches through the lateral surfaces 18$a$, 18$b$ that act as filter surfaces into the inner region of the half shell 14 and can flow there through the longitudinal slot 13 into the tank 21, from where it goes outward via the filter water outlet 8, e.g., into a cistern.

So that the water to be filtered does not bypass the filter surfaces and reach into the inner region of the half shell 14, the half shell is covered on its ends by two caps 19$a$, 19$b$.

The hollow cylinder 5 can be removed so the rain water filter can be cleaned. To this end, there is a semicircular arc 22 on the end wall 3 with the residual water outlet 7, on the inner side of which a seal 23 is inserted. The diameter of the arc 22 corresponds to the diameter of the hollow cylinder 5 so that the hollow cylinder can be inserted from above into the arc 22. The pipe 9 is introduced obliquely axially on the other side, wherein an offset or collar 24 is provided for further support, which almost completely surrounds the hollow cylinder 5.

The rain water filter functions as follows: the water that reaches the housing 1 through the inlet 6 flows completely into the pipe 9, wherein it runs off through the longitudinal slot 10 on the base of the pipe 9 little by little. Only if there is a very large incidence of water is the longitudinal slot 10 not in a position to receive the water so that a portion of the water flows through the pipe 9 directly into the residual water outlet 7. The pipe 9 therefore acts as an upper water course.

The water, which reaches the crescent space 11 through the longitudinal slot 10, runs from the top on the cover 17 of the half shell and runs there on both sides along the filter surfaces and in the process is largely suctioned inwardly into the half shell 14 by the adhesion effect described above. The rest of the water, which runs off on the half shell 14, remains in the hollow cylinder 5, the base of which therefore functions as the lower water course, and from there likewise flows into the residual water outlet 7.

The filtered water reaches the tank 21 through the longitudinal slot 13 in the base of the hollow cylinder 5 and from there the filter water outlet 8. Because the housing 1 is normally located in the entrance hole of a cistern, it directly reaches the collection chamber of the cistern from there.

Figure 4:
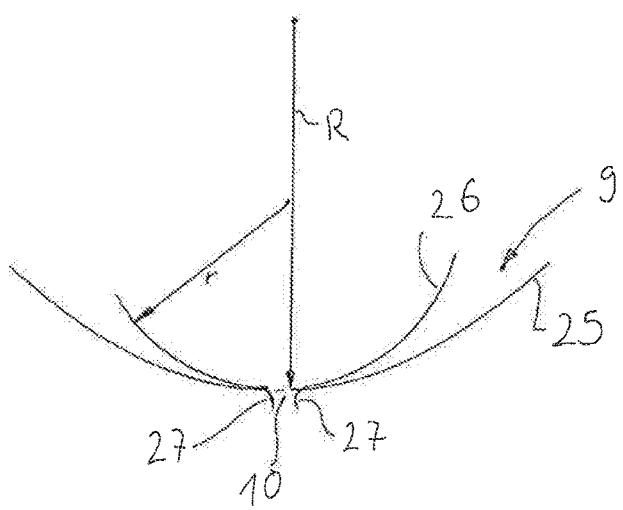
FIG. 4 is a schematic representation to illustrate the geometry of a pipe for the conveyance of water to the filter.

To optimize the flow of the water into the longitudinal slot, the pipe 9 has a cross-sectional shape that changes from the inlet to the residual water outlet, which is depicted in FIG. 4. FIG. 4 shows, in a superimposed manner, the base progression 25 of the longitudinal slot 10 in the region of the inlet and the base progression 26 of the longitudinal slot 10 in the region of the residual water outlet. Whereas the cross-sectional shape of the base in the region of the residual water outlet corresponds to a circle with the radius r, the base in the region of the inlet follows a clothoid, wherein the radius R of its curvature on the longitudinal slot 10 is greater than r and gets outwardly smaller. The radius R of the curvature becomes smaller for every cross-section that lies closer to the residual water outlet until it corresponds to the radius r of the circle in the region of the residual water outlet. Even the parameter that respectively defines the change in the curvature of a clothoid is adjusted continually in order to effect the transition to the circle.

To support the outflow into the longitudinal slot 10, a convexly curved, downward pointing lip 27 can be provided above all in the region in front of the residual water outlet on each of the two edges of the longitudinal slot 10.

LIST OF REFERENCE NUMBERS

1 Housing
2 End wall
3 End wall
4 Base
5 Hollow cylinder
6 Inlet
7 Residual water outlet
8 Filter water outlet
9 Pipe
10 Longitudinal slot
11 Crescent space
12 Filter
13 Longitudinal opening
14 Half shell
15 Outer layer
16 Inner layer
17 Cover
18a Lateral wall
18b Lateral wall
19a Cap
20a Deflector plate
19b Cap
20b Deflector plate
21 Tank
22 Arc
23 Seal
24 Collar
25 Base progression
26 Base progression
27 Lip

The invention claimed is:

1. A rain water filter, comprising:
a housing, wherein the housing includes a horizontally running lateral inlet, a horizontally running lateral residual water outlet for unfiltered water, and a filter water outlet for filtered water, wherein a horizontally running upper water course connects to the horizontally running lateral inlet and leads to the horizontally running lateral residual water outlet; and
a filter for filtering inflowing water, wherein a filter surface of the filter follows the horizontally running upper water course in a horizontal direction;
wherein the horizontally running lateral residual water outlet is downwardly offset in relation to the horizontally running lateral inlet, wherein a horizontally running lower water course is located below the horizontally running upper water course and merges into the horizontally running lateral residual water outlet, and wherein the filter is disposed such that unfiltered water running off from an inlet side of the filter reaches the horizontally running lower water course and from there the horizontally running lateral residual water outlet;
wherein the horizontally running upper water course is formed by a channel which has a longitudinal slot on a base and wherein the filter is located below the longitudinal slot and above the filter water outlet;
wherein the filter is formed by a half shell with a U-shaped cross-section, wherein the half shell sits with an open side downward on the horizontally running lower water course, and wherein a crown of the half shell runs below the longitudinal slot.

2. The rain water filter according to claim 1, wherein the filter is an adhesive filter.

3. The rain water filter according to claim 1, wherein a size of a local curvature of the base gets smaller in a region of the longitudinal slot from the horizontally running lateral inlet towards the horizontally running lateral residual water outlet.

4. The rain water filter according to claim 1, wherein the horizontally running lower water course includes a longitudinal opening which runs between lateral walls of the half shell, wherein a tank is located below the horizontally running lower water course, and wherein the tank is connected to the filter water outlet.

5. The rain water filter according to claim 1, wherein the half shell is closed on ends thereof.

6. The rain water filter according to claim 1, wherein the housing includes two opposing end walls, wherein the horizontally running lateral inlet is located in a first one of the two opposing end walls and the horizontally running lateral residual water outlet is located in a second one of the two opposing end walls, wherein a hollow cylinder that is open on both sides runs between the two opposing end walls and merges with a uniform cross-section into the horizontally running lateral residual water outlet, wherein a pipe is located in an upper portion of the hollow cylinder and connects with a uniform cross-section to the horizontally running lateral inlet, and wherein the filter is located in a crescent space between an outer wall of the pipe and an inner wall of the hollow cylinder.

7. The rain water filter according to claim 6, wherein the two opposing end walls are connected to each other via a half-shell-shaped base and wherein longitudinal edges of the half-shell-shaped base lie opposingly against an outer side of the hollow cylinder.

8. The rain water filter according to claim 6, wherein the hollow cylinder is held detachably on the two opposing end walls.

9. The rain water filter according to claim 8, wherein a half-arc runs on an inner side of the first one of the two opposing end walls into which one end of the hollow cylinder is insertable from above and wherein a collar or an offset for a uniform cross-sectional accommodation of the pipe is formed on an inner side of the second one of the two opposing end walls.

\* \* \* \* \*